United States Patent [19]

Akiyama

[11] Patent Number: 4,584,614
[45] Date of Patent: Apr. 22, 1986

[54] CHROMA SIGNAL PHASE CORRECTION CIRCUITRY TO BE USED IN A COLOR VIDEO INFORMATION PLAYBACK SYSTEM

[75] Inventor: Toru Akiyama, Tokorozawa, Japan

[73] Assignee: Pioneer Electronic Corporation, Tokorozawa, Japan

[21] Appl. No.: 522,704

[22] Filed: Aug. 12, 1983

[30] Foreign Application Priority Data

Aug. 17, 1982 [JP] Japan ............................... 57-142530

[51] Int. Cl.⁴ ............................................. H04N 9/89
[52] U.S. Cl. .................................... 358/312; 358/324
[58] Field of Search ............... 358/324, 325, 326, 312, 358/342, 907, 327

[56] References Cited

U.S. PATENT DOCUMENTS

| | | | |
|---|---|---|---|
| 3,852,520 | 12/1974 | Bruch | 358/324 |
| 4,001,876 | 1/1977 | Schiess et al. | 358/326 |
| 4,057,827 | 11/1977 | Hoogendijk | 358/312 |
| 4,236,173 | 11/1980 | Bierhoff et al. | 358/327 |
| 4,247,865 | 1/1981 | Mastronardi | 358/312 |

Primary Examiner—Donald McElheny, Jr.
Attorney, Agent, or Firm—Schwartz, Jeffery, Schwaab, Mack, Blumenthal & Evans

[57] ABSTRACT

A chroma signal phase correction circuitry to be used in a video information signal playback system for playing back the video information recorded on a recording medium, having a special playback mode of operation for jumping from one portion of recording tracks to the other, comprises a plurality of phase correction channel having a substantially constant frequency amplitude characteristics and a phase characteristics satisfying a condition that the difference between the phase shift values of each of the phase correction channel is equal to the difference between the phase of the color subcarrier signals of the color video signals from adjacent two recording track portions, and a switching means for selecting one of the phase correction channels for allowing the color video signal to pass therethrough, whereby compensating for the phase shift of the chroma signal during the jump operation while maintaining a phase of a luminance signal component of the color video signal.

4 Claims, 6 Drawing Figures

CHROMA SIGNAL PHASE CORRECTION CIRCUITRY TO BE USED IN A COLOR VIDEO INFORMATION PLAYBACK SYSTEM

BACKGROUND OF THE INVENTION

1. Field of the Invention

The present invention relates to a chroma signal phase correction circuitry, and more specifically to a circuitry for the phase correction of a chroma signal component of a color video signal played back from a system for playing back recorded information during an operation of jumping the recording tracks.

2. Description of Background Information

In the case of a recording medium such as a video disc, color video information is recorded on a recording track having a spiral form, in a manner such that a portion of the signal corresponding to two fields of picture information is recorded in a section of the recording track corresponding to one revolution of the recording disc.

With regard to the reproduction of the video information recorded on the video disc by means of a video disc player (VDP), several special playback modes such as a still picture playback mode and a double speed playback mode can be appropriately utilized in addition to a normal or standard playback mode.

While executing the special playback mode, it is necessary to use a jump operation by which a position on the recording medium at which the signal is being picked up is moved momentarily from a recording track portion at which the video signal is being picked up, to an adjacent recording track portion.

If the recorded signal is based on the NTSC system video signal, the difference of the phase of the chroma signal component becomes equal to 180° between two sections contained in two adjacent recording track portion, each having a length of one horizontal scanning period and which are arranged side by side.

Because of this phase difference, the color of the picture image will not be correctly reproduced on a monitoring device such as a picture tube if no phase correction is applied to the chroma signal. In other words, there will be a significant color disturbance absent a phase correction.

Therefore, several methods of phase correction have been utilized in the video disc player system. However, in the case of conventional arrangements, there have been drawbacks such that the phase of the luminance signal (Y signal) component of the video signal is also shifted by the phase correcting process of the chroma signal component. Furthermore, in order to eliminate the phase shift of the luminance signal component, it has been required to use a rather complicated circuit construction including a comb filter made up, for example, of a charge coupled device (CCD).

SUMMARY OF THE INVENTION

An object of the present invention is therefore to provide a phase correction circuitry for a chroma signal to be used in a system for playing back color video information which is capable of effecting the phase correction only to the chroma signal component using a rather simple circuit configuration.

According to the present invention a chroma signal phase correction circuitry for effecting phase correction on a chroma signal component of a color video signal played back from a recording medium upon the occurence of a jump operation by which a point of picking up recorded information is moved from one recording track portion to another, is characterized by a plurality of phase correction channels having a constant frequency-amplitude characteristics, and a phase characteristics satisfying a condition that a difference between the phase shift values of each of the phase correction channels at a frequency of a color subcarrier signal component of the color video signal is equal to a phase difference of color subcarrier signal components of color video signals from each of the recording track portions, and a switching means for selecting one of the phase correction channels for permitting the color video signal to pass therethrough, in response to each occurrence of the jump operation.

According to another aspect of the present invention, the color video signal is a signal based on the NTSC system, wherein the number of the phase correction channels is two, and the magnitude of the phase difference is selected at 180°.

According to further aspect of the invention the color video signal is a signal based on the PAL system, and wherein a first to fourth phase correction channels are provided and the difference among the phase characteristics of the phase correction channels are determined such that the phase shift amount from the first phase correction channel to the second phase correction channel, third phase correction channel, and fourth phase correction channel are respectively equal to 90°, 180° and 270°.

The further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the following description taken in conjunction with the accompanying drawings which are given by way of illustration only, and thus are not limitative of the present invention, and wherein.

DETAILED DESCRIPTION OF THE PREFERRED EMBODIMENTS

Figure 1:
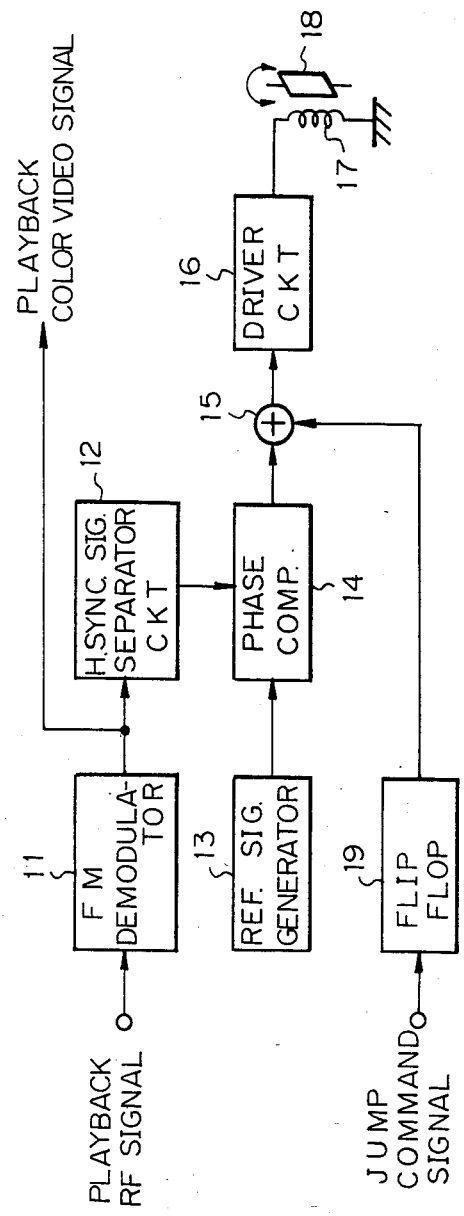
FIG. 1 is an example of prior art chroma signal phase correction circuit.
Figure 2:
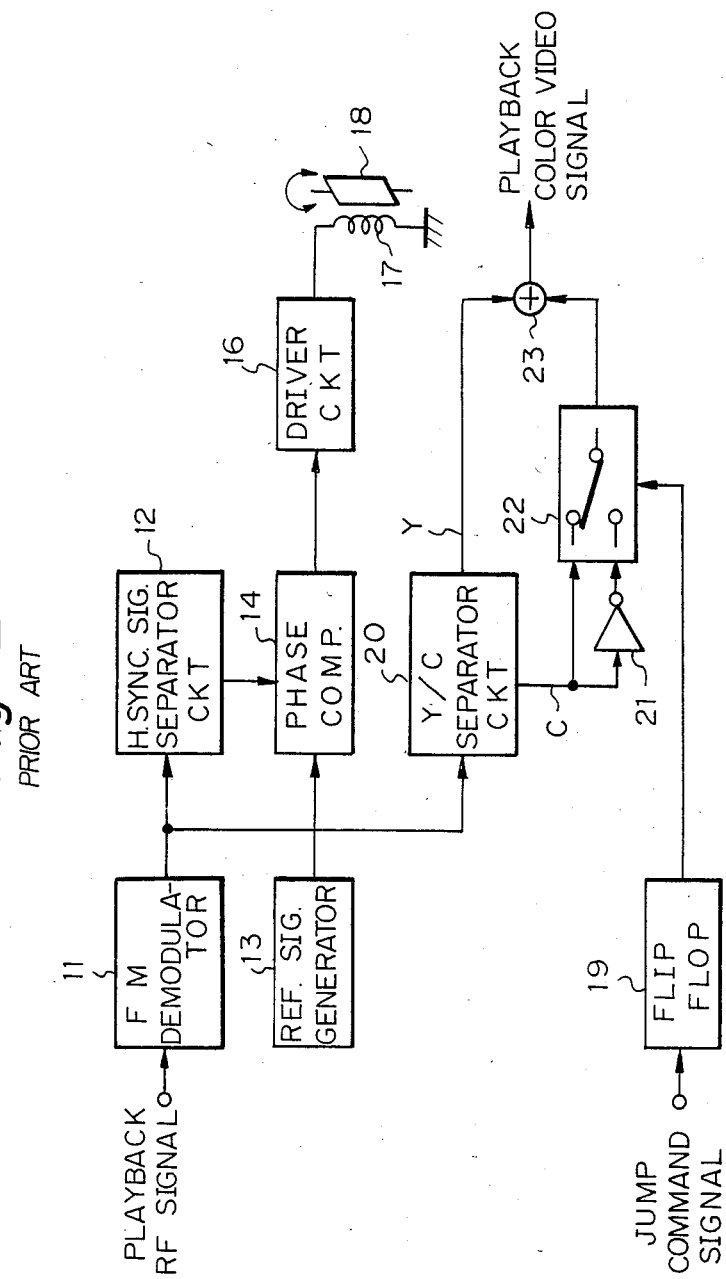
FIG. 2 is another example of prior art chroma signal phase correction circuit.

Before entering into the explanation of the embodiment of the phase correction circuit according to the present invention, reference is first made to FIGS. 1 and 2, which show examples of the prior art chroma signal phase correction circuit. As shown in FIG. 1, an RF (radio frequency) video information playback signal from a pickup means is converted to a video signal at an FM demodulator 11. The demodulated video signal is then applied to a horizontal synchronizing signal separator circuit 12 in which a playback horizontal synchronizing signal is reproduced from the video signal. The playback horizontal synchronizing signal is then applied to a phase comparator 14 which also receives a reference signal from a reference signal generator 13. An output signal of the phase comparator 14 is then applied via an adder circuit 15 to a driver circuit 16 which produces a drive current for a driving coil 17 of a tangential mirror 18 which is rotated around a vertical axis in accordance with the driving current. In response to the rotational movement of the tangential mirror 18, the position of the light spot of a readout laser beam, at which the recorded information is picked up from the recording disc, is moved in a tangential direction of the recording track. Thus, the correction of the time base of the playback signal is performed.

In addtion, there is provided a flip flop circuit 19 which is set or reset in accordance with the generation of the jump command signal. An output signal of the flip flop circuit 19 is applied to the driver circuit 16 via the adder circuit 15. If the time difference between a high level output signal and a low level output signal of the flip flop circuit 19 is equal to 140 ns which corresponds to a 180° phase difference of a color subcarrier signal, it becomes possible to shift the time axis of the color video signal by an amount corresponding to the 180° phase shift of the color subcarrier signal. However in the case of this phase correction circuit there is a drawback, as mentioned before, that not only the chroma signal component but also the luminance signal component is shifted in phase by an amount of 140 ns each time the jump operation is executed.

A method which has been utilized for eliminating this drawback will be then explained with reference to the circuit diagram of FIG. 2. In FIGS. 1 and 2, numerals denote like parts or corresponding circuit elements.

As shown, a luminance component and chrominance component (Y/C) separator 20 which receives the output signal of the FM demodulator 11 is provided for separating the chroma signal from the demodulated video signal. The thus separated chroma signal is applied to a switching circuit 22 and to an inverter curcuit 21 which applies the inverted signal of the chroma signal to the switching circuit 22. One of the chroma signal and the inverted chroma signal which is selected in accordance with the operation of the switching circuit 22 is then combined with the luminance signal at an adder circuit 23 so as to provide a playback color video signal. The switching operation of the switching circuit 22 is controlled in accordance with the output signal of the flip flop circuit 19. With this arrangement, only chroma signal C is shifted in phase by an amount of 180° at the timing of each of the jump operations and no phase shift is effected upon the luminance signal. However, in order to provide this circuit arrangement, it is necessary to utilize the signal separator 20 which is implemented by a charge coupled device (CCD) forming a so called comb filter. Therefore, there is a disadvantage that the cost for producing the circuit becomes considerably higher than for the usual circuit arrangement.

Figure 3:
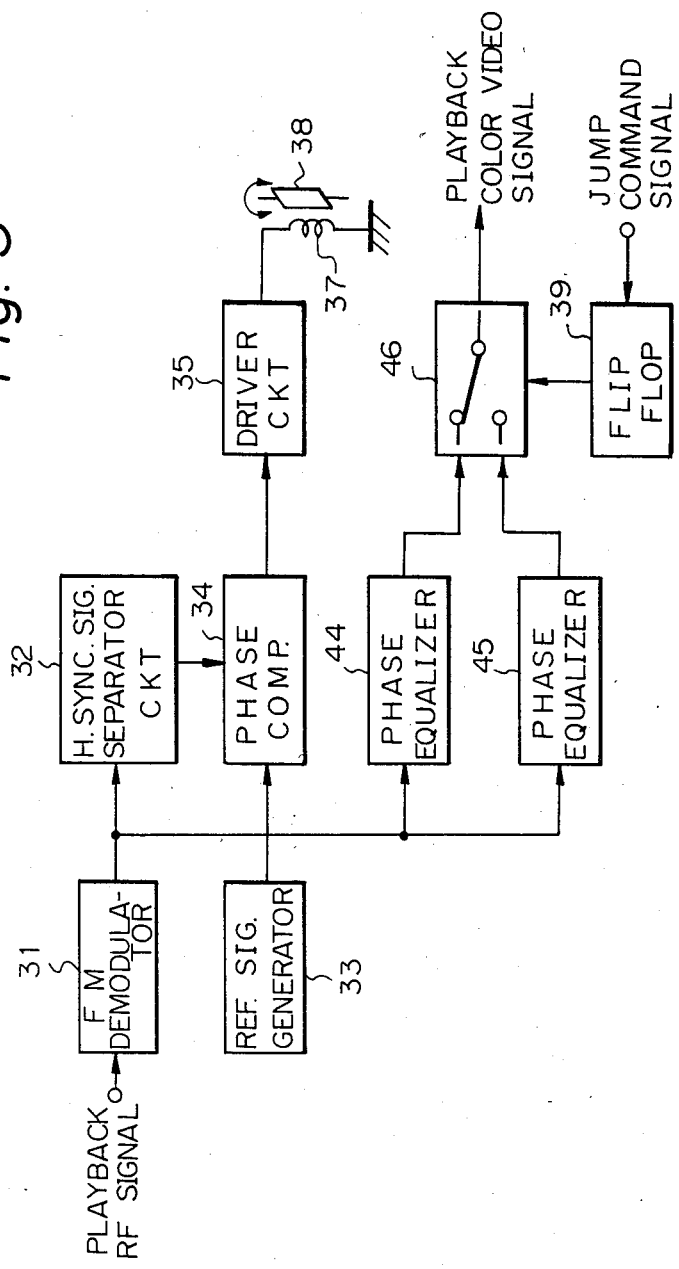
FIG. 3 is a block diagram of an embodiment of the chroma signal phase correction circuit according to the present invention.
Figure 4:
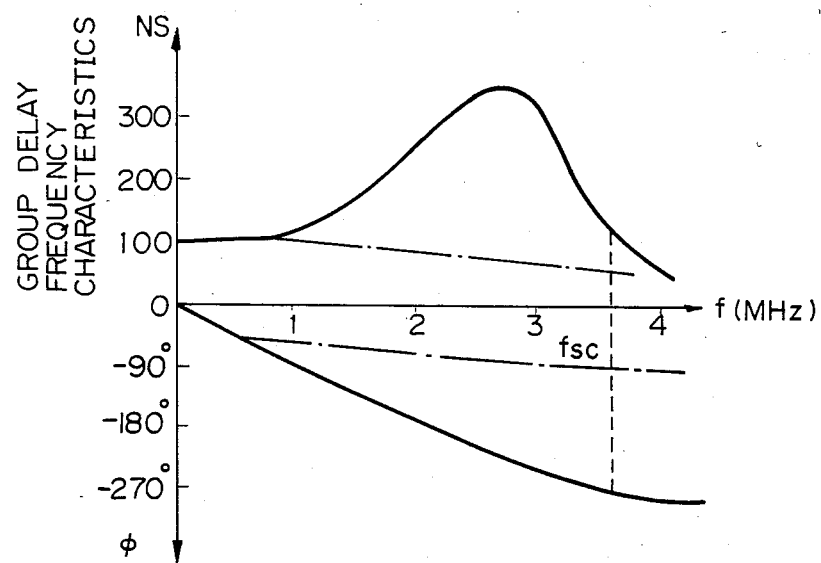
FIG. 4 is a diagram showing the frequency transmission characteristics of the phase equalizer circuit of the chroma signal phase correction circuit shown in FIG. 4.
Figure 5:
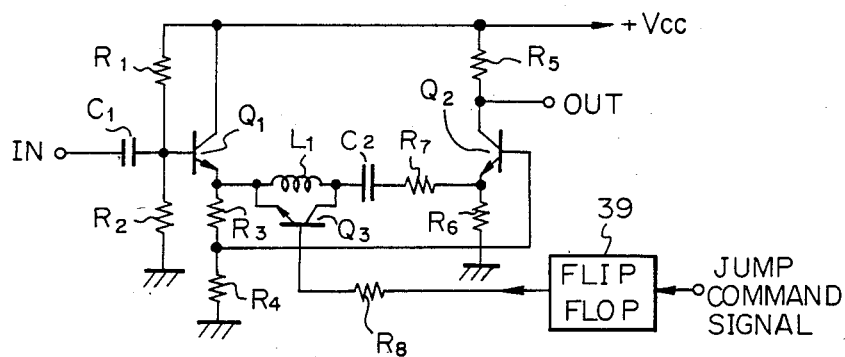
FIG. 5 is an example of the circuit arrangement of the phase equalizer circuit of FIG. 3.

Referring to FIG. 3 through FIG. 5, a first embodiment of the chroma signal phase correction circuit according to the present invention will be explained hereinafter. The first embodiment is an example of a chroma signal phase correction circuit to be used in an NTSC system color video signal playback system.

As shown in FIG. 3, there is provided an FM demodulator 31 which receives an RF signal picked up from a video disc by means of a pick up means. An output signal of the FM demodulator 31 is then applied to a horizontal synchronizing signal separator 32 and to a pair of phase equalizers 44 and 45. A horizontal synchronizing signal separated at the horizontal synchronizing signal separator 32 is then applied to a phase comparator 34 in which the horizontal synchronizing signal is compared with a reference signal from a reference signal generator 33. An output signal of the phase comparator 34 is then applied to the driver circuit 35 which produces a driving current for a driving coil 37 of a tangential mirror 38.

The frequency-amplitude characteristics of the phase equalizers 44 and 45 are designed such that the output signal level throughout the frequency range of the color video signal is constant. With this characteristics, a level change of the color video signal after passing through the phase equalizer is eliminated.

FIG. 4 shows the group delay characteristics of the phase equalizers 44 and 45, in which the solid lines show the chracteristic curves of the phase equalizer 44 and the partly doted lines show the characteristic curves of the phase equalizer 45.

Specifically, the phase characteristics of the phase equalizer 44 is such that the delay of the phase is equal to 270° at the frequency fsc (3.58 MHz) of the color subcarrier signal. The group delay frequency characteristics of the phase equalizer 44 is such that the delay time is around 100 ns for a frequency range lower than 1 MHz, and it increases as the frequency increases up to a peak of 400 ns at 3 MHz. For the frequency range higher than 3 MHz, the delay time decreases with frequency and it is equal to 150 ns at the frequency fsc of the color subcarrier signal. On the other hand, the phase characteristics of the phase equalizer 45 is such that the delay of the phase increases with the frequency and it is equal to $-90°$ at the frequency fsc. The group delay frequency characteristics of the phase equalizer 45 is such that the delay time gradually decreases with the frequency and it is equal to 100 ns at 1 MHz and lower (as was the case of the phase equalizer 44) and it has a value of 50 ns at the frequency fsc.

Therefore, the signals respectively passed through the phase equalizers 44 and 45 have the same level and further the group delay frequency characteristics are the same with each other for the frequency range lower than 1 MHz. However, the phase of the chroma signal component is $-90°$ and $-270°$ respectively, and therefore the phase difference is equal to 180°. Since one of these signals passed through the phase equalizers 44 and 45 is in turn selected in the switching circuit 46 in response to the jump operation, the phase inversion affects only to the chroma signal component and most of the luminance signal component is not subjected to the phase shift. In addition, even though the highest frequency end of the luminance signal component is accompanied with the slight shift of the time axis, that is not likely to cause any serious effect upon the quality of the picture image reproduced on the display device. Therefore, satisfactory phase correction of the chroma signal can be obtained by the use of the above described circuitry.

Referring to FIG. 5, the detailed circuit construction of the phase equalizers 44 and 45 and the switching circuit 46 will be further explained. As shown, the input signal from the FM demodulator 31 of FIG. 3 is applied via a capacitor $C_1$ to a buffer circuit consisting of a transistor $Q_1$, and resistors $R_1$ and $R_2$. An output signal of the buffer circuit is picked up from a junction between emitter resistors $R_3$ and $R_4$ and applied to the base of a transistor $Q_2$. The playback color video signal is outputted from the collector of the transistor $Q_2$ at which a load resistor $R_5$ is connected. Between the emitter of the transistor $Q_1$ and the emitter of the transistor $Q_2$ at which an emitter resistor is connected, there is disposed a series circuit of an inductance $L_1$, capacitor $C_2$, and a resistor $R_7$. In the sense of eqivalency, this series circuit can be considered as connected in parallel to the emitter resistor $R_6$. Further, there is provided a transistor $Q_3$ whose collector and emitter are connected to the terminals of the inductance $L_1$ to short circuit the terminals of the inductance $L_1$. The base potential of the transistor $Q_3$ is controlled by an output signal of a flip flop circuit 39 which is applied via the resistor $R_8$.

With this arrangement, the the phase characteristics of the circuit can be switched between a secondary type LCR and a primary type CR. When the transistior $Q_3$ turns off, the secondary type LCR is obtained, i.e. the phase control characteristics of the phase equalizer 44 is obtained. On the other hand, when the transistor $Q_3$ turns on, the primary type CR is obtained, i.e. the phase control characteristics of the phase equalizer 45 is obtained.

However, it is to be appreciated that the circuit constructions of the phase equalizers 44 and 45 and the switching circuit 46 are not limited to this circuit arrangement, and various modifications are possible to those skilled in the art. As an example, the phase shift of the the phase equalizer 44 at the frequency of fsc can be determined to be equal to zero. In that case, it is necessary to choose the phase shift of the phase equalizer 45 at this frequency at 180°.

Although the explanation has been made by way of an example for the treatment of an NTSC system color video signal, the technique according to the present invention is also applicable to the treatment of the PAL system color video signal.

The relationship between the frequency of the color subcarrier signal and the frame frequency $f_V$ in the case of the PAL system is expressed as follows:

$$fsc = 177344.75 \times f_V$$

Therefore, there is a phase difference of 90° between the pieces of chroma signals of one holizontal scanning period, which are in two sections of two adjacent recording tracks positioned side by side. Therefore, during the jump operation for the special playback mode, the phase shift of the chroma signal from the initial phase value increases as the number of the jump operation increases, in the order of 90°, 180° and 270°.

Accordingly, it is necessary to effect a phase shift correction of 90° to each piece of the chroma signal component contained in the playback video information signal which is obtained by the pickup means.

Figure 6:
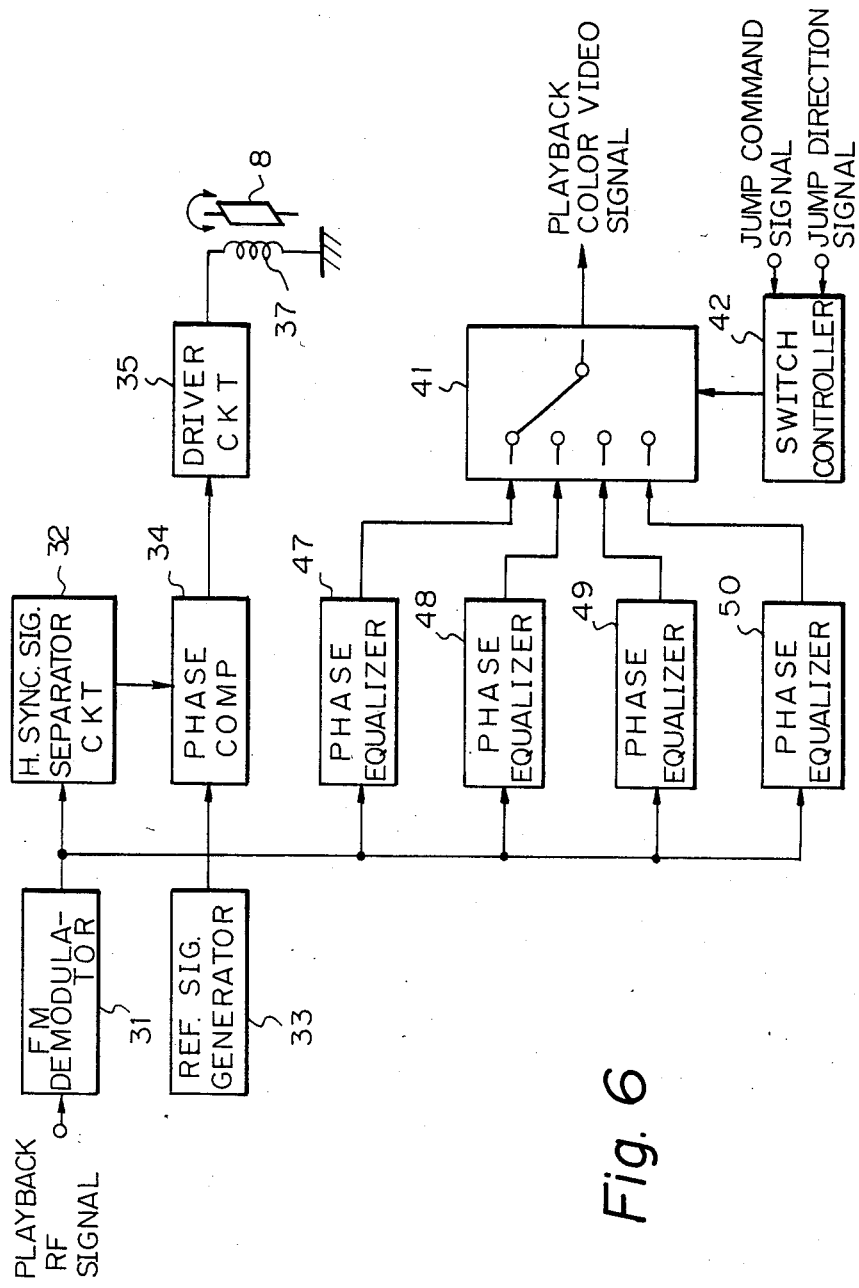
FIG. 6 is a block diagram of a second embodiment of the phase correction circuit according to the present invention which is to be utilized in a PAL system video signal playback system.

An embodiment of the phase correction circuitry for the PAL system video signal will be explained hereinafter with reference to FIG. 6 in which like reference numerals used in FIG. 3 denote like circuit elements.

As shown, the output signal of the FM demodulator 31 is applied through first to fourth phase equalizers 47 to 50. Output signals of the phase equalizers 47 to 50 are applied to a switching circuit 41 which selects one of those output signals from the phase equalizers 47 to 50, in accordance with a control signal which is produced by a switch controller 42. The switch controller 42 receives the jump command signal and a jump direction indication signal. The level-frequency characteristics of the phase equalizers 47 to 50 are such that the output level of the circuit is substantially constant throughout the whole frequency range of the playback video signal. Accordingly, there is no level change of the playback video signal before and after the switching operation of the switching circuit 41. With regard to the phase-frequency characteristics of the phase equalizers 47 to 50, the amount of the phase retardation of each of the phase equalizers 47 to 50 at the frequency fsc is determined to be 90° for the phase equalizer 17, 180° for the phase equalizer 48, 270° for the phase equalizer 49, and 0° for the phase equalizer 50. In addition, the phase characteristics and the group delay frequency characteristics of the phase equalizers 47 to 50 for the frequency range lower than 1 MHz are selected to be equal to each other respectively.

The operation of this phase correction circuit is as follows. During a forward jump operation, the switching circuit 41 selects the output signal of the phase equalizers 47 to 50 in the order of the first phase equalizer 47, the second phase equalizer 48, the third phase equalizer 49, and the fourth phase equalizer 50 and then selects the first phase equalizer 47 and so forth. Therefore, the phase shift correction is effected in the order of 90°, 180°, 270°, 0°, and 90°. On the other hand, in the case of the jump operation of the reverse direction, the phase equalizers are selected in the order of the first phase equalizer 47, the fourth phase equalizer 50, the third phase equalizer 49, the second phase equalizer 48, and then the first phase equalizer 47 and so forth. Therefore, the phase shift correction is effected in the order of 90°, 0°, −270°, −180°, −90°.

It will be appreciated from the foregoing that according to the present invention, the phase correction for only to the chroma signal component is performed without using a Y/C separating circuit. Therefore, the circuit construction is by far simplified as compared with the conventional arrangement in which the Y/C separation is performed by a comb filter made up of a charge coupled device. Furthermore, the phase correction circuitry according to the present invention can be used in such a manner that the output signal of the video disc player system is combined with another video signal while maintaining the synchronization between two video signals. In such a case, it is difficult to use the phase correction circuit of the prior art since the phase of all components of the video signal is inverted by 180° at each occurence of the jump operation.

In addition, the phase correction circuit according to the present invention can be utilized for a video signal of a system other than the NTSC system and the PAL system.

It should be understood that the foregoing description is for illustrative purpose only, and is not intended to limit the scope of the invention. Rather, there are numerous equivalents to the preferred embodiments, and such are intended to be covered by the appended claims.

What is claimed is:

1. A chroma signal phase correction circuitry for use with a playback system in which a playback color video signal is picked up from a recording medium having a plurality of recording track portions, said playback system generating a jump command signal for moving an information reading point from one recording track portion to another, characterized by a plurality of phase correction channels for a playback color video signal including luminance and chrominance components, each of said phase correction channels having substantially constant frequency-amplitude characteristics throughout a whole frequency range of said playback color video signal and phase characteristics of each of said phase correction channels being adjusted so that a difference between the phase shift values of said phase correction channels at a frequency of a color subcarrier signal component of said color video signal is equal to a phase difference between said color subcarrier signal component of said color video signals recorded in said recording track portions, and a switching means for selecting in turn one of said phase correction channels for transmitting said playback color video signal in synchronism with each generation of said jump command signal.

2. A chroma signal phase correction circuity as set forth in claim 1, wherein said color video signal is of the NTSC system, and wherein the number of said phase correction channels is two, and said difference between phase shift values is selected at 180°.

3. A chroma signal phase correction circuitry as set forth in claim 2, comprises a first transistor whose base is connected to a source of the color video signal, a second transistor whose base is connected to an emittter circuit of said first transistor, and providing the playback color video signal at a collector thereof, a feedback series circuit of an inductance, a capacitor and a resistor, connected between an emitter of said first transistor and an emitter of said second transistor, a switching element connected between terminals of said inductance for short-circuitting said inductance upon receipt of a control signal, and a flip flop circuit for providing said control signal to said switching element upon receipt of every two jump command signals, whereby a first phase correction channel is defined through said first and second transistors when said switching element is opened, and a second phase correction channel is defined through said first and second transistors when said switching element is closed.

4. A chroma signal phase correction circuitry as set forth in claim 1, wherein said color video signal is of the PAL system, and wherein said plurality of phase correction channels are first to fourth phase correction channels and said difference between phase shift values of said phase correction channels is determined to be 90° between the first and second phase correction channels, 180° between the first and third phase correction channels, and 270° between the first and fourth phase correction channels respectively.

* * * * *